United States Patent
Uhlenbusch et al.

(10) Patent No.: US 10,696,205 B2
(45) Date of Patent: Jun. 30, 2020

(54) BEVERAGE HOLDER AND BEVERAGE CONTAINER

(71) Applicant: DR. SCHNEIDER KUNSTSTOFFWERKE GMBH, Kronach (DE)

(72) Inventors: Olaf Uhlenbusch, Marktzeuln (DE); Claus Schinzler, Kronach (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 206 days.

(21) Appl. No.: 15/571,472

(22) PCT Filed: Apr. 27, 2016

(86) PCT No.: PCT/EP2016/059391
§ 371 (c)(1),
(2) Date: Nov. 2, 2017

(87) PCT Pub. No.: WO2016/177612
PCT Pub. Date: Nov. 10, 2016

(65) Prior Publication Data
US 2018/0079344 A1  Mar. 22, 2018

(30) Foreign Application Priority Data
May 4, 2015 (DE) .......................... 10 2015 106 882

(51) Int. Cl.
*F25B 21/04* (2006.01)
*B60N 3/10* (2006.01)

(52) U.S. Cl.
CPC .............. *B60N 3/104* (2013.01); *F25B 21/04* (2013.01)

(58) Field of Classification Search
CPC ...... F25B 21/04; F25D 31/006; F25D 31/007; F25D 2331/80; F25D 2331/805; B60N 3/104; B60N 3/106
See application file for complete search history.

(56) References Cited

U.S. PATENT DOCUMENTS

| 8,720,494 | B2 | 5/2014 | Combrink | 141/10 |
| 9,080,807 | B2 * | 7/2015 | Cho | F25D 17/062 |

FOREIGN PATENT DOCUMENTS

| DE | 202010000855 U1 * | 7/2010 | B60N 3/104 |
| DE | 202010000855 | 8/2010 | B60H 1/32 |
| DE | 102008012218 | 9/2010 | B65B 1/18 |
| DE | 102009012218 | 9/2010 | B60N 3/10 |
| DE | 102009049188 | 5/2011 | B60N 3/10 |

OTHER PUBLICATIONS

DE202010000855U1 Translation.*
(Continued)

*Primary Examiner* — Brian M King
(74) *Attorney, Agent, or Firm* — Hayes Soloway P.C.

(57) ABSTRACT

A beverage holder for a beverage container having a device adapted to communicate with a detecting unit. In order to achieve a quick cooling or heating of a beverage in the beverage container, a temperature control unit is operated in an extended temperature range once this has been communicated to a control unit by the detecting unit, wherein the control unit is in contact with the detecting unit and the temperature control unit.

21 Claims, 8 Drawing Sheets

(56) References Cited

OTHER PUBLICATIONS

German Office Action(w/machine translation) issued in application No. 10 2015 106 882.6, dated Mar. 9, 2016 (11 pgs).
International Preliminary Report on Patentability (w/translation) issued in application No. PCT/EP2016/059391, dated Nov. 7, 2017 (14 pgs).
International Search Report and Written Opinion (w/translation) issued in application No. PCT/EP2016/059391, dated Jul. 19, 2016 (17 pgs).

* cited by examiner

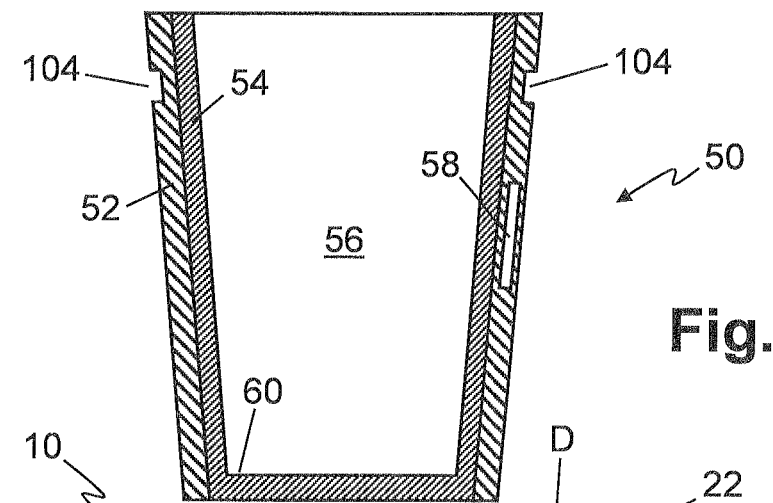
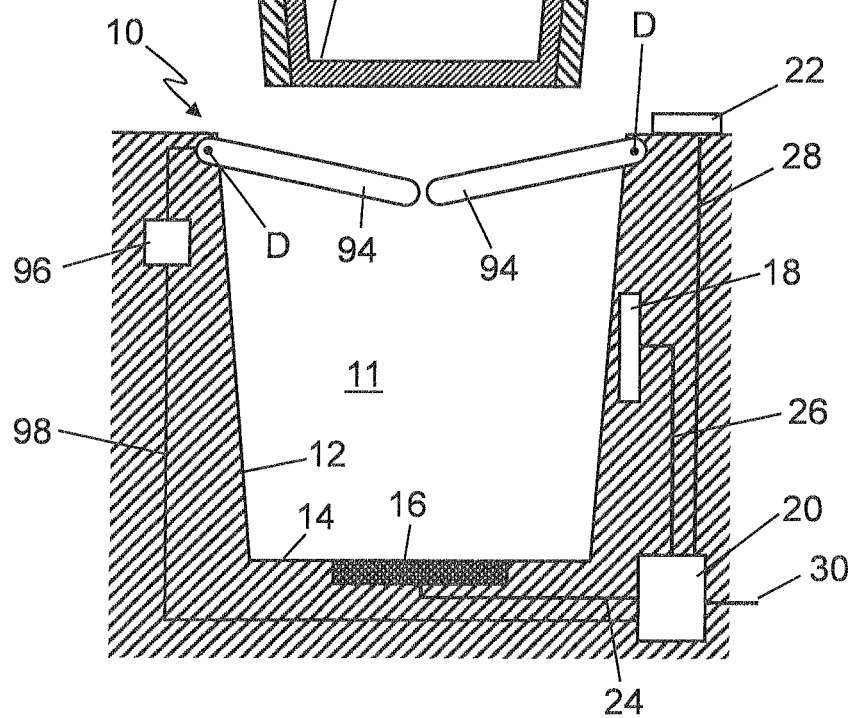
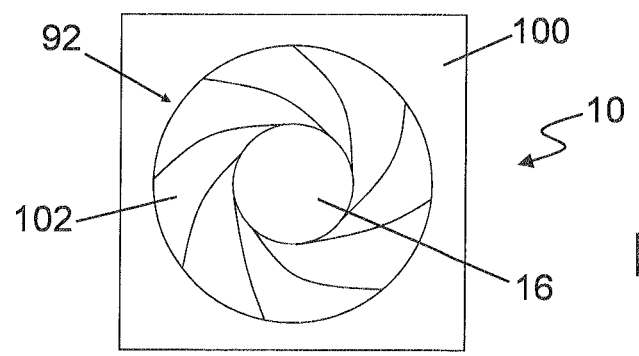
Fig. 14
Fig. 15

BEVERAGE HOLDER AND BEVERAGE CONTAINER

BACKGROUND OF THE INVENTION

A beverage holder for receiving beverage containers, and a beverage container, are described. Beverage holders are used in air, water and land vehicles. Beverage holders are also termed cupholders particularly in motor vehicles.

A beverage holder has a receiving space in which, for example, beverage cans or cups can be inserted. In addition, holding elements are often provided to make it possible to securely hold even beverage containers with a smaller diameter. Moreover, so-called thermo-cupholders are known, which have means for heating or cooling or for keeping hot or cold the beverage present in a beverage container. In that regard, setting means serving the purpose of providing a keeping-warm function or a cooling function for the beverage container are provided at the beverage container or at a control surface, which is provided for controlling the beverage container, or a control panel provided for that purpose. Beverage containers of that kind usually have surfaces with good thermal conductivity so as to transfer the thermal output of a heating or cooling element to the beverage container and thus to the beverage. For safety reasons, the contact surfaces for the beverage container should not be heated above 53° C. and not cooled below 4° C. However, due to this temperature limitation is not possible to provide cooling or heating in, in particular, a relatively short period of time.

Thus, for example, DE 20 2010 000 855 U1 describes a vehicle with an air-conditioning installation and a beverage holder, wherein media channels coupled with a vehicle air-conditioning installation are provided. In addition, a desired temperature can be preset by way of a control unit, in which case comparison is carried out by way of a temperature detector. In addition, a beverage container detector serving the purpose of detecting the presence of a beverage container and the size of a beverage container can be provided.

It is problematic with the beverage holder of DE 20 2010 000 855 U1 that this too cannot provide temperatures above 53° C. and below 4° C. at the contact surfaces. It is thus not possible to carry out rapid cooling or fast heating.

A beverage container with a Peltier element is disclosed in, for example, DE 10 2009 049 188 A1. The Peltier element is arranged at the base surface of the beverage holder and serves for cooling or heating a beverage container. Rapid cooling or heating is also not possible here, since a limitation with respect to the provided temperatures is present for safety reasons.

A method for controlling a holding device and an associated holding device for a container in a vehicle is disclosed in DE 10 2008 012 218 A1. The method serves for controlling the holding device in a vehicle, the holding device having a container receptacle in which a container can be placed and temperature influencing equipment for influencing the temperature of a container. For that purpose, data of at least one sensor are received and evaluated, wherein depending on the data of at least one first sensor at least one holding element is activated in order to hold the container—which is deposited in the container receptacle and recognised—or is deactivated in order to release the container deposited in the container receptacle. Depending on the data of the at least one sensor the container content of the container is subject to temperature influencing, in which case the data of the at least one sensor are evaluated for recognition of at least one temperature influencing wish and at least one temperature influencing function corresponding with a recognised temperature influencing wish is executed. The correspondingly disclosed holding device is provided for a container in a motor vehicle and serves for carrying out the afore-described method.

It is therefore the object to indicate a beverage holder and a beverage container which provide rapid heating and cooling by comparison with devices from the prior art, wherein the beverage holder is constructed for different beverage containers and adheres to safety requirements.

SUMMARY OF THE INVENTION

A beverage holder for receiving beverage containers and which fulfils the aforesaid object
- comprises a receiving space for beverage containers and a wall, which at least regionally surrounds the receiving space, and a base,
- at least the base has temperature influencing equipment, which is coupled with recognition equipment,
- the recognition equipment is constructed for the purpose of differentiating between a beverage container, which is received in the receiving space, with a device co-operating with the recognition equipment and a beverage container without such a device,
- the beverage container with a device coupled with the recognition equipment rests at least partially on the temperature influencing equipment in the inserted state in the beverage holder and
- a control constructed for the purpose of controlling the temperature influencing equipment at least in dependence on the differentiation by the recognition equipment is provided.

The beverage holder is distinguished by the fact that the temperature influencing equipment can provide significantly higher temperatures than 53° C. and lower temperatures than 4° C. when a beverage container of appropriate construction is received. The presence of the appropriately constructed beverage container takes place by way of the recognition equipment. If a beverage container has a device co-operating therewith, after recognition by the recognition equipment the temperature influencing equipment can be operated in a further temperature field. Recognition by the recognition equipment can be carried electromagnetically, electrically, mechanically or pneumatically or by means of radio. The recognition equipment and the device in the beverage container are constructed appropriately to that purpose. It is thereby possible to cool or heat a beverage, which is present in the special beverage container, significantly more quickly than was previously possible in the prior art. If a beverage container without a device co-operating with recognition equipment is inserted then cooling or heating is carried out analogously to the method of the prior art, in which case temperatures above 53° C. and below 4° C. are not reached. Only after recognition of a special beverage container can the temperature equipment operate in a further temperature range. For that purpose a control communicating with the recognition equipment is provided. The recognition equipment can, for example, also be constructed for the purpose of recognising the presence of a beverage container as such. In addition, the recognition equipment can also be constructed for the purpose of detecting the size of a beverage container received in the receiving space.

The recognition equipment can comprise a reader for reading an NFC chip and/or a transponder. A beverage container with a device co-operating with the recognition equipment is in that case an NFC chip and/or a transponder. By way of that it is possible, in the case of insertion of a beverage container into the receiving space of the beverage holder, to recognise by way of near field communication by the detector whether a beverage container is received which should be heated or cooled in a significantly larger temperature range. Moreover, this can also take place by way of a transponder in the beverage container, in which case transmission of data takes place by means of RFID. In solutions of that kind it is additionally possible to store data in the chip so that the detector obtains further data in addition to the information that a wider temperature range should be covered by the temperature influencing equipment. Thus, for example, it is possible to store the material from which the beverage container is made and the person who is associated with this container. For example, in the case of a beverage container with better thermal conductivity a different temperature range can be covered than in the case of a beverage container with a thermal conductivity which is worse by comparison. In that regard it is to be noted that the beverage container is to be designed in such a way in terms of construction that the heat transferred to the thermally conductive material cannot lead to injury of a user. For that purpose it is possible to provide, for example, an insulating layer which surrounds the beverage container at its outer surface.

If a user, for example, always uses the same beverage container for coffee then after insertion of this beverage container it is possible by way of the control to automatically set a keeping-warm function in a specific temperature range or by way of a control panel to ask the user whether he or she wishes to start an appropriate keeping-warm function. Correspondingly, in the case of a specific beverage container in which always cold beverages are received, an enquiry concerning a cooling process could be provided.

In addition to the temperature influencing equipment at the base, at least one further item of temperature influencing equipment arranged at, for example, the wall can be provided. In that regard, cooling or heating of beverage containers can be carried out even more rapidly by a device communicating with the recognition equipment since a larger thermal transmission area can be provided. In addition, conventional beverage containers can be cooled or heated by way of lateral items of temperature influencing equipment, but in a restricted temperature range.

In further embodiments the temperature influencing equipment has a structured surface on which a correspondingly constructed thermal transmission area, for example the base of a beverage container, can be placed. In the case of a structure, the thermal transmission area or contact area is increased without, for example, the diameter of the temperature influencing equipment having to be increased. Structures can comprise elevations and depressions, in which case the structures can moreover comprise pyramids, cones, prisms, etc., or have a similar surface structure such as, for example, a waffle iron.

The temperature influencing equipment can be mounted to be displaceable in height and displaceable by way of the beverage container with the device. Alternatively, the beverage holder can have an insulating unit which is mounted to be displaceable in height and which is displaceable by way of the beverage holder. In such forms of embodiment a mechanical safeguard against injury by contact is provided. If use is made of a beverage container without a device co-operating with the recognition equipment then the temperature influencing equipment or the insulating unit can be disposed in an upper position. This conventional beverage container then rests on the temperature influencing equipment, in which case conventional cooling or a heating can take place. If use is made of a beverage container with a device co-operating with the recognition equipment, in which case the beverage container has an appropriate shaping, the beverage container presses the temperature influencing equipment or the insulating unit downwardly. If the temperature influencing equipment or the insulating device has been moved downwardly a further temperature zone can be covered by the temperature influencing equipment only in this state. In order that injury to persons is not possible after removal of the beverage container it is provided in a further embodiment for the temperature influencing equipment to be displaced upwardly back to the starting position only when it has exceeded or fallen below specific temperature values.

In further embodiments the insulating unit can be displaced downwardly not only by a conventional beverage container, but also by a beverage container with a device. After the displacement, the base of the conventional beverage container and the base of the beverage container with a device communicating with the recognition equipment lie at least regionally on the temperature influencing equipment. However, in the case of a conventional beverage container, only heating and cooling in a temperature range of 4° C. to 53° C. can take place, since the recognition equipment does not deliver to the control a report that a beverage container with a device communicating with the recognition equipment has been received. The control therefore then releases only the restricted temperature range. If a beverage container with a device communicating with the recognition equipment has been inserted, the control releases the widened temperature range for cooling below 4° C. and heating above 53° C.

In addition, spring elements can be provided which automatically move the insulating unit upwardly after removal of a conventional beverage container or a beverage container with a device communicating with the recognition equipment. As a result, the temperature influencing element is at least regionally covered by the insulating unit or the contact areas after movement of the insulating unit upwardly are disposed below an upper area of the insulating unit. Improved protection against injuries is thereby given, since contact with the temperature influencing element is prevented regardless of the temperature range. Spring elements can be formed by, for example, compression springs or pneumatic, electrical, electromechanical or other mechanical means.

The beverage holder can comprise means which in the displaced state of the temperature influencing equipment or the insulating unit mechanically or electrically release an operating mode of the temperature influencing equipment. In that case, the recognition equipment can be formed by means which mechanically, for example by displacement of the temperature influencing equipment or the insulating unit in downward direction, or electrically, for example by producing or interrupting a contact, make possible the widened operating mode (temperatures above 53° C. or below 4° C.).

The temperature influencing equipment can comprise a plurality of temperature influencing elements displaceable in height. Equally, the insulating unit can additionally or alternatively comprises a plurality of insulating elements displaceable in height. The temperature influencing elements in the inserted state of the beverage container in the receiving space of the beverage holder bear against co-operating base elements of the beverage container. The temperature influencing elements can have a small cross-sectional area, wherein the temperature influencing elements are surrounded by insulating base ribs of the receiving compartment. Analogously thereto, the insulating elements project beyond, for example, the temperature influencing elements when no beverage container is inserted. In further embodiments the insulating elements of the beverage holder are moved downwardly by co-operating insulating elements of a beverage container, as a result of which base elements/temperature influencing elements of the beverage container come into contact with temperature influencing elements of the beverage holder. Further protection against injury to a user is thereby provided.

The wall of the beverage holder can have at least one item of temperature influencing equipment, which protrudes into the receiving space. The temperature influencing equipment in the wall can then engage in corresponding lateral depressions of a beverage container, which has thermal transmission elements in the depressions.

The temperature influencing equipment can comprise a Peltier element. Peltier elements are particularly suitable for cooling or heating, since these can be activated in simple manner by repoling so as to provide corresponding cooling or heating. In addition, the temperature is settable by way of current flow.

The control can be connected with further devices for detection of an actual temperature and for setting a target temperature or comprise such further devices and/or the control can be connected with or comprise a memory in which temperature values can be variably stored. Devices for setting a target temperature comprise—non-definitively—rotary knobs, regulators or buttons or can be represented by way of a touch-sensitive display. The temperature values stored in variable manner comprise, for example, temperatures which are selected by a user and which have been chosen with respect to a specific beverage container. In that case, the control can propose to a user a specific temperature if the user re-inserts a beverage container for which the user has selected specific temperatures several times in the past. In addition, depending on the filling of the beverage container and by way of the devices for detection of an actual temperature it is possible to store values which allow prediction of how much time is needed for heating or cooling. In that case, the control can additionally be connected with means detecting the filling state of a device. This can be carried out, for example, optically or by way of weight detection. Equally, resistance measurements are possible for detection of the filling state. The control can also optimise heating or cooling of a beverage for a specific beverage container if a multiplicity of data for different filling states is filed in a memory. In addition, cooling or heating can be controlled in dependence on vehicle parameters. Equally, further temperatures, such as the outside temperature in the case of a motor vehicle and the inside temperature in a driver's cab or in the vehicle, can be utilised for the determination for cooling or heating. The prediction and determination can be carried out with greater accuracy the more values for a beverage container are already stored and/or are available.

In further forms of embodiment the beverage holder can comprise closure equipment which holds a beverage container with a device, which co-operates with the recognition equipment, in the state of reception in the receiving chamber and closes the receiving space when no beverage container is received. The closure equipment is coupled with a control and comprises at least one device by way of which opening and closing of the closure equipment takes place. The control causes opening of the closure equipment when a beverage container with a device communicating with a recognition equipment approaches. Alternatively, opening of the closure equipment takes place by pressing the beverage container on the closure equipment. In that regard, two different embodiments additionally arise. In one embodiment, a conventional beverage container can also be inserted in the beverage holder. The beverage container presses the closure equipment downwardly or produces opening again by the applied pressure, for example against the force of at least one spring device. Since recognition of a special beverage container with a device does not take place by the recognition equipment, subsequently cooling and heating only in a restricted temperature range can be carried out. If, by contrast, a beverage container with a device communicating with the recognition equipment is inserted, which similarly opens the closure equipment by means of pressure, a further temperature range for cooling and heating is released by way of the control. In another embodiment, the closure equipment comprises means which in itself opens the closure equipment, for example by way of an electric motor. If a beverage container with a device (for example transponder) communicating with the recognition equipment approaches the beverage container then the control causes opening of the closure equipment. A conventional beverage container does not produce opening. In order to receive a conventional beverage container, in this embodiment the closure equipment has to be opened by way of a command from a control unit. For example, a button is provided which causes opening and optionally also closing of the closure equipment after actuation thereof. Cooling and heating in a widened temperature range cannot, however, then be undertaken, since the recognition equipment has not recognised the presence of a beverage container with a device co-operating with the recognition equipment.

In the case of spring-loaded embodiments the closure equipment is closed once more when the beverage container is removed from the beverage holder. In embodiments with automatic activation of the closure equipment, closing takes place when, for example, it has been recognised by way of the recognition equipment that an appropriate beverage container is no longer present in the region of the beverage holder or when a command from a control unit is present. In the received state of a beverage container the closure equipment can also move back again to the extent that it bears against the outer wall of the beverage container. The receiving space is thereby closed off relative to the environment, as a result of which cooling and heating can take place more rapidly since no heat is delivered to the environment. This also reduces the necessary energy for cooling and heating. Moreover, the receiving space can also remain cool or warm longer if no beverage container is received, since the receiving space is then closed. The closure equipment can be formed by, for example, a desired number of flaps pivotably mounted on the wall of the beverage holder or by a shutter closure similar to a diaphragm in photography apparatus. The shutter closure can, in particular, lie in encircling manner against a beverage container. In addition, sealing means can be provided in the case of the closure equipment.

The closure equipment therefore additionally protects against injuries. In addition, dust and dirt are prevented in simple manner from entering the receiving space of the beverage holder. Further, the receiving space of the beverage holder is closed if no beverage container is received therein. This makes possible a visually pleasing appearance of the beverage holder since no 'hole' is visible, for example in a centre console of a motor vehicle.

In the case of a beverage container with a device for characterisation of the beverage container, which fulfils the aforesaid object, the beverage container has a receiving space with a wall, which surrounds the receiving space, and a base,
the receiving space has a thermally conductive material at least regionally,
the beverage container has an insulating layer which at least regionally surrounds the receiving space and which consists of a thermally insulating material,
the base of the receiving space at least regionally is not covered by the insulating layer,
the beverage container has a device constructed for the purpose of communicating the presence of the beverage container to recognition equipment of a beverage holder in the state of insertion in the beverage holder and
the beverage container is so constructed that the base of the receiving space in the inserted state of the beverage container rests at least partially on temperature influencing equipment of the beverage holder.

A beverage present in such a beverage container can be heated or cooled in a wider temperature range in beverage holders with recognition equipment. In addition, the beverage container can also be inserted into a beverage holder which does not have recognition equipment. The beverage present in the beverage container can then be heated or cooled conventionally. If, however, the beverage container is inserted into a beverage holder having recognition equipment then the insertion of the beverage container causes activation so that cooling of the beverage container below 4° C. or heating of the beverage container above 53° C. can take place. The device can communicate with the recognition equipment of a beverage container by way of radio or mechanically, electrically, electromagnetically or pneumatically.

A transponder and/or an NFC chip can be arranged in the insulating layer of the beverage container. The recognition equipment of the beverage holder notifies by way of the transponder and/or by way of the NEC chip that the beverage container can be operated in a wider temperature range.

The base of the receiving space of the beverage container can project beyond the insulating layer, or the insulating layer of the beverage container can project beyond the base of the receiving space of the beverage holder. Constructions of that kind can be provided with respect to the design of the base of the receiving space of a beverage holder. If the insulating layer of the beverage container projects beyond the base of the receiving space of the beverage container at the underside thereof then additional protection against injuries is given.

The base of the receiving space of the beverage container can comprise a plurality of base elements and an insulating layer which surrounds the base elements at a spacing and projects beyond the base elements. Such a design of the beverage container is provided for beverage holders having a plurality of temperature influencing elements which are preferably displaceable in height. In that case, the projecting insulating layer arranged at a spacing ensures that there is no injury to persons when they contact the beverage container at the lower end thereof.

The base and/or the wall of the beverage container can be connected with at least one thermally conductive element extending along the wall, wherein the at least one thermally conductive element is arranged in a depression and the insulating layer projects at least regionally beyond the at least one thermally conductive element. In the case of such embodiments, the beverage container can, for example, be inserted into a beverage holder having at least one item of temperature influencing equipment protruding into the receiving space of the beverage holder. A more rapid cooling and heating can be carried out by way of the temperature influencing equipment at the base of the beverage holder and the at least one item of temperature influencing equipment at the wall of the receiving space of the beverage container since a greater area for thermal transmission is present. Cooling or heating in the widened temperature range is possible only when the presence of a beverage container co-operating with the recognition equipment has been recognised by way of the recognition equipment.

In further embodiments the beverage container can also be used in beverage holders which do not have temperature influencing equipment at the wall of the beverage holder. The at least one thermal conductor is connected with the base and/or the wall of the beverage container, which consists or consist of thermally conductive material. As a result, cooling and heating of the thermal conductor takes place as a function of the heating or cooling of the base and/or the wall. The arrangement of the at least one thermal conductor in a depression makes it possible for a person to hold the beverage container without coming into direct contact with the at least one thermal conductor.

Injuries are thereby prevented, even when the beverage container has been cooled or heated in a widened temperature range. The person holds the beverage container at contact surfaces which are formed by the insulating layer at the outer wall of the beverage container and protrude outwardly of the at least one thermal conductor. Since the at least one thermal conductor is exposed and not covered by the insulating layer and projects outwardly the person holding the beverage container in hand has an indication whether the beverage present in the beverage container is cold or hot without having to come into direct contact with the at least one thermal conductor.

The recesses can have different shapes. Several depressions with a thermal conductor can be provided in uniform or non-uniform distribution over the beverage container. Accordingly, a beverage holder can then have correspondingly constructed items of temperature influencing equipment projecting into the receiving space.

The beverage container can further be constructed for reception of a beverage and/or a beaker, a cup, a bottle, a glass, a can or a beverage pack in the receiving space. In particular, the beverage container can be constructed not only for reception of a beverage, but also a further beverage container. In that case, for example, it is possible for a conventional beverage can to be cooled in a wider temperature range than would be possible if only the beverage can is inserted into a beverage holder with a recognition equipment.

The material of the receiving space can be a metal or a plastics material with a high thermal conductivity. The material of the insulating layer can be, in particular, a plastics material which has poor thermal conductivity or is made in such a way that the outer surface of the beverage container gripped by a user is not too cold or hot.

The beverage container can, for example, consist of a multi-component plastics material which has on the one hand a low density and on the other hand a high thermal conductivity. Moreover, use can be made of, for example, aluminium and thermally-conductive polyamides as materials for the beverage container. It is additionally possible to add special fillers to plastics material so as to achieve specific characteristics. Thermoplastic elastomers can also be used as material for at least parts of the beverage container. Thermally conductive plastics materials can be obtained by admixture of specific fillers to common plastics materials such as, for example, PA, PC, PP, PPS, PEEK and other such. The beverage container can be so constructed through selection of the materials employed that it is cleaning-friendly and washing-machine-proof.

The beverage container can be of conical construction at least regionally, in which case analogously thereto the beverage holder can similarly be of conical construction. The conical construction makes possible easy insertion and removal of the beverage container into and from the beverage holder. The conical construction additionally prevents jamming of the beverage container in the receiving space of the beverage holder when the beverage container is cooled or heated. In that case, small changes with respect to height and diameter of the beverage container and also the beverage holder can occur. If, however, the beverage container and the beverage holder have a conical shape, a change in the dimensions of the beverage container and/or the beverage holder does not produce jamming. In a given case, lifting-up of the beverage container may take place.

In specific embodiments the receiving space of the beverage container consists substantially entirely of a thermally conductive material. The insulating layer prevents direct contact of a person with the thermally conductive material and therefore provides protection against injuries. However, it can nevertheless be perceived by a person whether the beverage present in the beverage container is cold or hot. The person is thus given feedback by touch.

The insulating layer can consist of a material having friction-reducing characteristics. The insertion and removal of the beverage container into and from the beverage holder is thereby ensured and facilitated even in the case of high and low temperatures.

In further embodiments the receiving space of the beverage container comprises an alloy such as, for example, gadolinium, by way of which—in addition to a Peltier element provided in the beverage holder as temperature influencing equipment—heating or cooling can take place. In that regard, a strong magnetic field is generated in the beverage container, which heats the gadolinium or other alloy by magnetocalorific effect. The gadolinium or other alloy cools down when the magnetic field is removed, as a result of which cooling takes place. For example, the temperature influencing equipment of the beverage container can have, instead of a Peltier element, equipment for generating a magnetic field.

The beverage container can have an upper section projecting above the region which in the completely inserted state of the beverage container is received in a beverage holder. This section can be of cylindrical or similarly conical construction. The section can, in addition, have grip elements which enable easy removal. For example, encircling rings of a plastics material are provided. As plastics material use can be made for that purpose of, for example, thermoplastic elastomers which fulfil the requirements of a defined capability of gripping, slip resistance and insulation.

The beverage container can comprise a locking device by way of which the beverage container is fixable in a beverage holder. The locking device is so constructed that it is held by, for example, the afore-described closure equipment of the beverage container in the received state in the beverage holder. For example, the locking device is an encircling groove at the outer wall of the beverage container. If the beverage container has been inserted into the receiving space of the beverage holder the closure equipment of the beverage holder engages in the groove and holds the beverage container in position and closes off the receiving space of the beverage holder relative to the environment. For preference, closure equipment, which is constructed as a diaphragm closure or closure shutter, of the beverage holder can engage in a groove of the beverage container.

BRIEF DESCRIPTION OF THE DRAWINGS

Further advantages, features and possibilities of embodiment are evident from the following description, by way of figures, of embodiments which are to be understood as non-limiting.

In the drawings:

FIG. 14 shows a schematic view of a beverage holder and a beverage container of a ninth form of embodiment; and FIG. 15 shows a schematic plan view of a beverage holder of a tenth form of embodiment.

Parts and components provided with the same reference symbols in the figures substantially correspond with one another insofar as nothing to the contrary is indicated.

DETAILED DESCRIPTION OF THE INVENTION

In the case of the beverage containers and beverage holders described in the following, components not essential to understanding of the technical teaching described herein are not described, since it is known to an expert how an appropriate realisation and design has to be effected.

Figure 1:
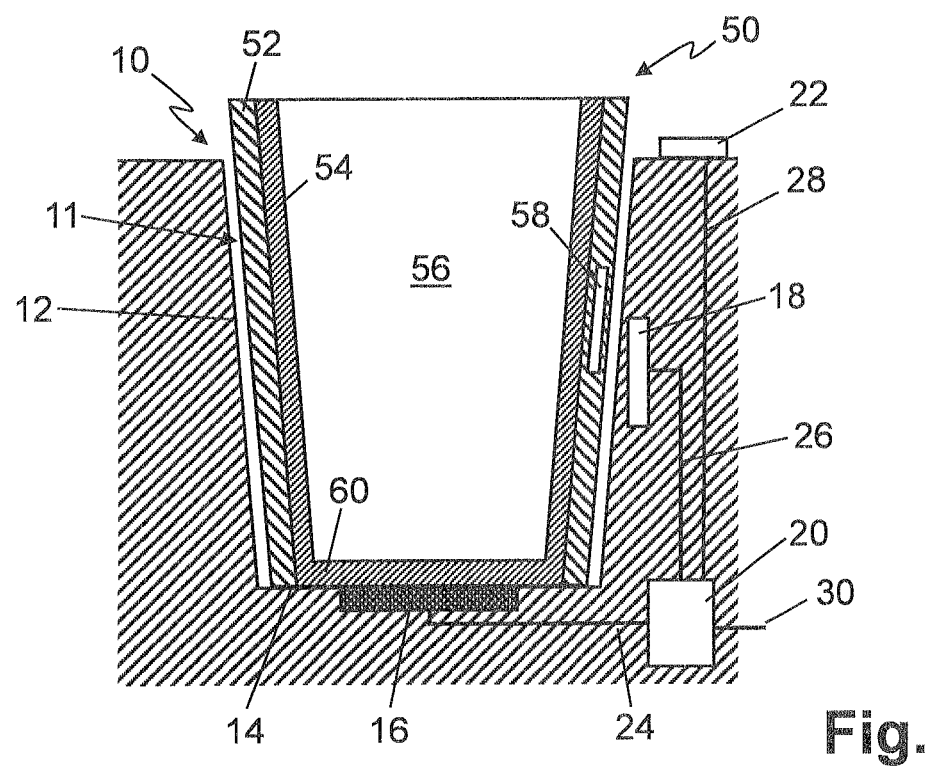
FIG. 1 shows a schematic sectional view of a beverage holder and a beverage container, which is inserted into the beverage holder, of a first form of embodiment.

FIG. 1 shows a schematic sectional view of a beverage holder 10 and a beverage container 50, which is inserted into the beverage holder 10, of a first form of embodiment. The beverage holder 10 can be integrated in a centre console or in other components of a motor vehicle. Moreover, it is also possible for the beverage holder 10 to be constructed as a separate unit and/or to be withdrawable. The beverage holder 10 has a receiving space 11. The receiving space 11 is defined by a wall 12, which surrounds the receiving space 11, and a base 14. Temperature influencing equipment 16 is arranged in the base 14. The temperature influencing equipment 16 comprises a Peltier element. The temperature influencing equipment 16 can preferably be of cylindrical construction. In addition, the receiving space 11 can also be of cylindrical construction, in which case the base 14 defines a circular area. The diameter of the temperature influencing equipment 16 can, in departure from the illustration in FIG. 1, also fill out the entire area of the base 14.

A reader 18 is arranged in the wall 12 of the beverage holder 10. The reader 18 serves for reading out an NFC chip or a transponder 58. The beverage holder 10 additionally comprises a control unit 22 making it possible for a user to set defined temperatures. The temperature set by a user represents the desired temperature for a beverage present in the beverage container 50. Moreover, a control 20 can be provided which can bidirectionally communicate with the temperature influencing equipment 16, the reader 18 and the control unit 22. The control 20 serves for controlling the operation of the temperature influencing equipment 16, this taking place as a function of the data provided by way of the reader 18 and the presets made by the user by means of the control unit 22. For that purpose the control 20 is connected with the temperature influencing equipment 16 by way of a line 24, with the reader 18 by way of a line 26 and with the control unit 22 by way of a line 28. In addition, the control 20 is connected by way of a line 30 with at least one further control unit of a motor vehicle. By way of the control unit of the motor vehicle it is possible for, for example, vehicle-relevant data, inputs by way of a control screen or environmental parameters (internal or external temperature) to be interrogated and received, in which case the control 20 utilises these for control of the temperature influencing equipment 16. The control 20 additionally comprises an internal memory or is connected with a memory by way of the line 30. Data from beverage containers 50 received in the beverage holder 10 and data connected therewith are stored in the memory. In addition, data from beverage containers 50 received in the beverage holder 10 and data connected therewith are stored in the memory. Data connected therewith can be the internal temperature of a vehicle interior space, the outside temperature, the vehicle speed, etc.

The beverage container 50 has a receiving space 56 enclosed by a wall 54 and by a base 60. The wall 54 and the base 60 consist of a material with high thermal conductivity. The beverage container 50 has an insulating layer 52 which surrounds the wall 54. A transponder 58 is accommodated in the insulating layer 52. The insulating layer 52 consists of a material which does not heat up or cool down, or which heats up or cools down only insignificantly, when the walls 54 and base 60 are heated or cooled.

If the beverage container 50 is inserted into the receiving space 11 of the beverage holder 10 the recognition equipment 18 recognises that a beverage container 50 with a device (transponder 58) has been inserted, which container should be dealt with in a wider temperature range. This information is transferred from the reader 18 to the control 20. The control 20 then releases, for the temperature influencing element 16, a temperature range allowing heating of the temperature influencing element 16 and thus of the base 60 as well as the walls 54 of the beverage container 50 to below 4° C. and above 53° C.

A user can set by way of the control unit 22 that, for example, the beverage present in the beverage container 50 is to be heated to 40° C. Such heating would be possible even with a conventional beverage container from the prior art, but would require a comparatively lengthy heating-up phase. In the case of the system in FIG. 1, consisting of the beverage holder 10 and the beverage container 50, heating can be carried out significantly more rapidly, since higher temperatures (>53° C.) can be provided by way of the temperature influencing equipment 16. In addition, injury to the user due to burning is prevented, since the insulating layer 52 is not heated or not heated to an extent corresponding with the wall 54 and the base 60.

Figure 2:
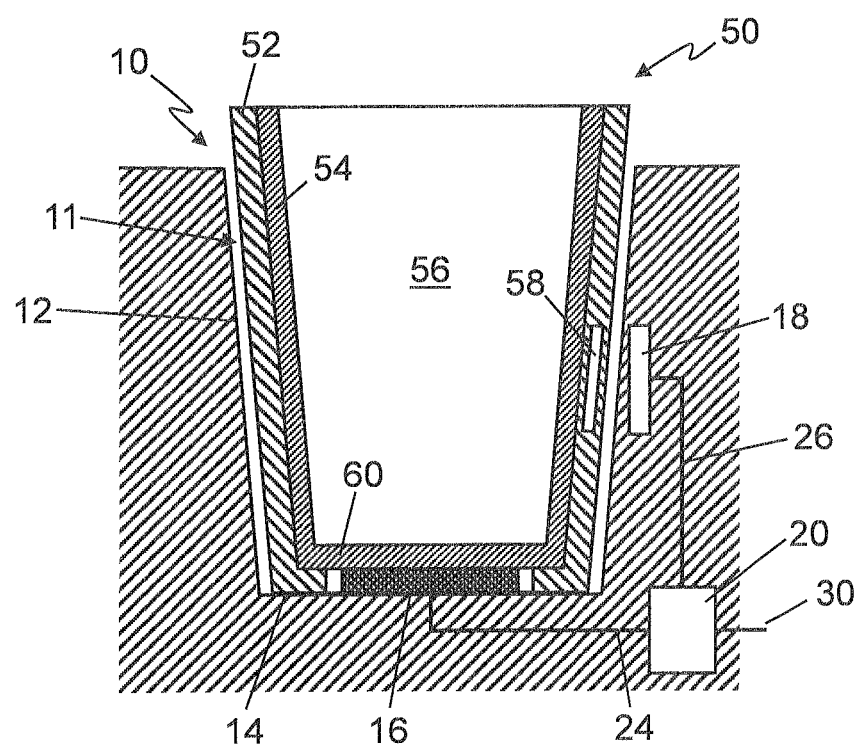
FIG. 2 shows a schematic sectional view of a beverage holder and a beverage container, which is inserted into the beverage holder, of a second form of embodiment.

FIG. 2 shows a schematic sectional view of a beverage holder 10 and a beverage container 50, which is inserted into the beverage holder 10, of a second form of embodiment.

No control unit 22 is illustrated in the second form of embodiment. However, even in the second form of embodiment as well as in further forms of embodiment described in the following (third form of embodiment to eighth form of embodiment) a control unit 22 of that kind can be provided. This is not depicted for reasons of clarity.

The second form of embodiment differs from the first form of embodiment additionally in that the insulating layer 52 of the beverage container 50 also extends in the region of the base of the beverage container 50 and leaves free a part of the base 60. Beyond that, the temperature influencing equipment 16 is so arranged at the base 14 of the receiving compartment 11 that the temperature influencing element 16 projects beyond the base 14. As illustrated in FIG. 2, the beverage container 50 can then be introduced into the receiving compartment 11 in such a way that the base 60 rests directly on the temperature influencing equipment 16. The presence of the beverage container 50 is detected by means of RFID, in which case the reader 18 determines the presence of a special vessel, such as the beverage container 50, through the transponder 58. Instead of communication by way of RFID a near-field communication (NFC: Near Field Communication) could also take place by way of RFID. In that regard, a widened temperature range for the temperature influencing equipment 16 is released only when an NFC chip (analogous to the transponder 58) is directly opposite the reader 18.

Figure 3:
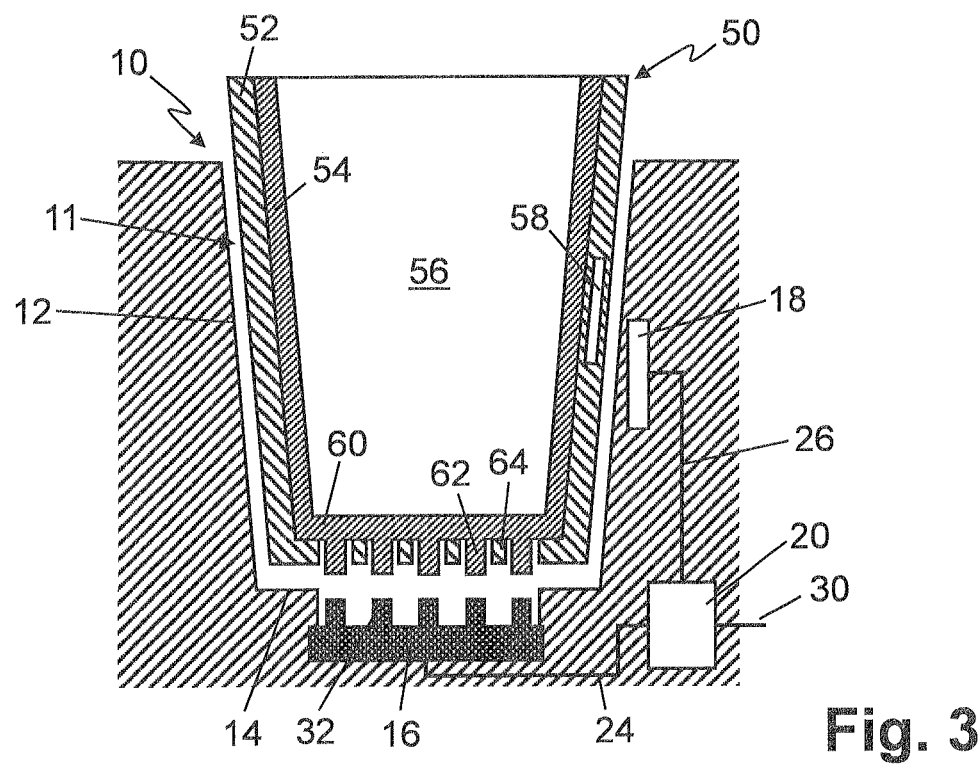
FIG. 3 shows a schematic sectional view of a beverage holder and a beverage container, which is partly inserted into the beverage holder, of a third form of embodiment.

FIG. 3 shows a schematic sectional view of a beverage holder 10 and a beverage container 50, which is partly inserted into the beverage holder 10, of a third form of embodiment.

The third form of embodiment differs from the second form of embodiment in that the temperature influencing equipment 16 comprises temperature influencing elements 32 which project upwardly. In addition, the temperature influencing equipment 16 is arranged in a recess of the base 14 of the receiving compartment 11.

Further, the beverage container 50 has, at the base 60, base elements 62 which are similarly formed from a conductive material. Extending between the temperature influencing elements 32 are ribs 64 which are formed from the same material as the insulating layer 52. The ribs 64 are in addition connected with the rest of the insulating layer 52. The ribs 64 and the base elements 62 are substantially arranged and constructed as shown, by way of example, in FIG. 7. Analogously thereto the temperature influencing elements 32 are arranged in corresponding manner.

The recessed arrangement of the temperature influencing equipment 16 ensures that a user is better protected from injury due to freezing or burning, since the temperature influencing equipment 16 with the temperature influencing elements 32 ends below the surface of the base 14. In addition, the temperature influencing elements 32 can, by virtue of the pin-shaped design thereof, cool down or heat up more rapidly due to the ambient temperature. In analogous manner with respect to the base elements 62 these can cool down or heat up more rapidly after removal of the beverage container 50 from the receiving compartment 11. In the completely inserted state of the beverage container 50 in the receiving compartment 11 the lower surfaces of the base elements 62 rest on the upper surfaces of the temperature influencing elements 32, in which case heating or cooling in a wider temperature range is possible as a result. Advantageously, in that case there is also no air gap between the base elements 62 and the temperature influencing elements 32.

Figure 4:
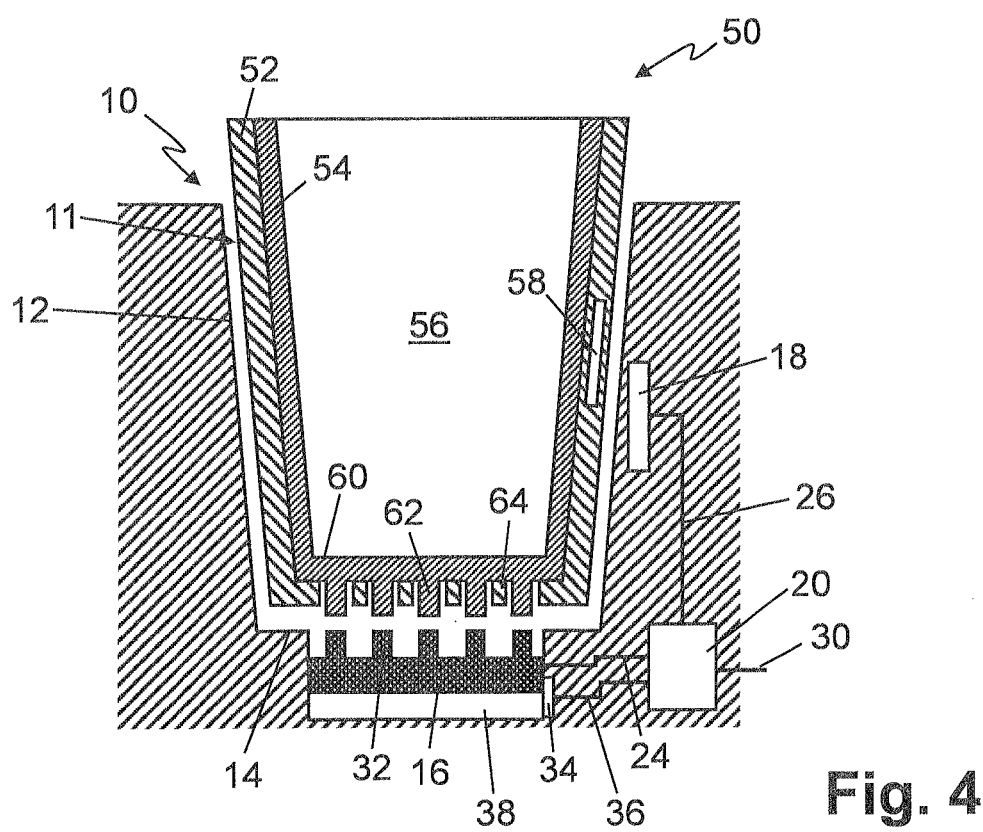
FIG. 4 shows a schematic sectional view of a beverage holder and a beverage container, which is partly inserted into the beverage holder, of a fourth form of embodiment.

FIG. 4 schematically shows a sectional view of a beverage holder 10 and a beverage container 50, which is partly inserted into the beverage holder 10, of a fourth form of embodiment.

The fourth form of embodiment differs from the third form of embodiment in that the temperature influencing equipment 16 is movable downwardly in a space 38. In addition, a detection unit 34 which can bidirectionally communicate with the control 20 by way of a line 36 is provided. The temperature influencing equipment 16 is so arranged in the space 38 that this can be displaced downwardly by way of the base elements 62, for which purpose the base elements 62 press against the temperature influencing elements 32. The temperature influencing equipment 16 can be urged out of the space 38 by way of at least one spring device. If the beverage container 50 is inserted into the receiving space 11 of the beverage holder 10 then the lower surfaces of the base elements 62 come into contact with the upper surfaces of the temperature influencing elements 32. If the beverage container 50 is inserted further downwardly in the receiving space 11 until the lower insulating layer 52 rests on the base 14 of the receiving space 11 the base elements 62 urge the temperature influencing equipment 16 downwardly in the space 38 against the force of the at least one spring device. The displacement is detected by the detection unit 34. The detection unit 34 transmits this information to the control 20, which then releases a wider temperature range for cooling or heating the beverage, which is present in the beverage container 50, by way of the temperature influencing equipment 16. In addition, a reader 18 and a transponder 58 are provided in the fourth form of embodiment. The reader 18 and the transponder 58 are not necessarily required in this form of embodiment. The recognition equipment for recognising whether a beverage container 50, which is constructed appropriately for a wider temperature operation, is received in the receiving space 11 can also be formed just by the detection unit 34. The movement of the temperature influencing equipment 16 or the reaching of a lower position can then serve as information for the presence of an appropriate beverage container 50. However, a reader 18 and a transponder 58 can additionally be provided in the system, which is shown in FIG. 4, of the fourth form of embodiment, in which case the displacement of the temperature influencing equipment 16 serves as a mechanical safeguard against injuries. Cooling or heating in the widened temperature range then takes place only when the temperature influencing equipment 16 has been moved into the space 38. In order to exclude further injury, the detection unit 34 or the control 20 can be connected with further means (not illustrated) which allow movement of the temperature influencing equipment 16 upwardly into the setting shown in FIG. 4 only when the temperature influencing equipment 16 has exceeded or fallen below specific temperature limits.

Figure 5:
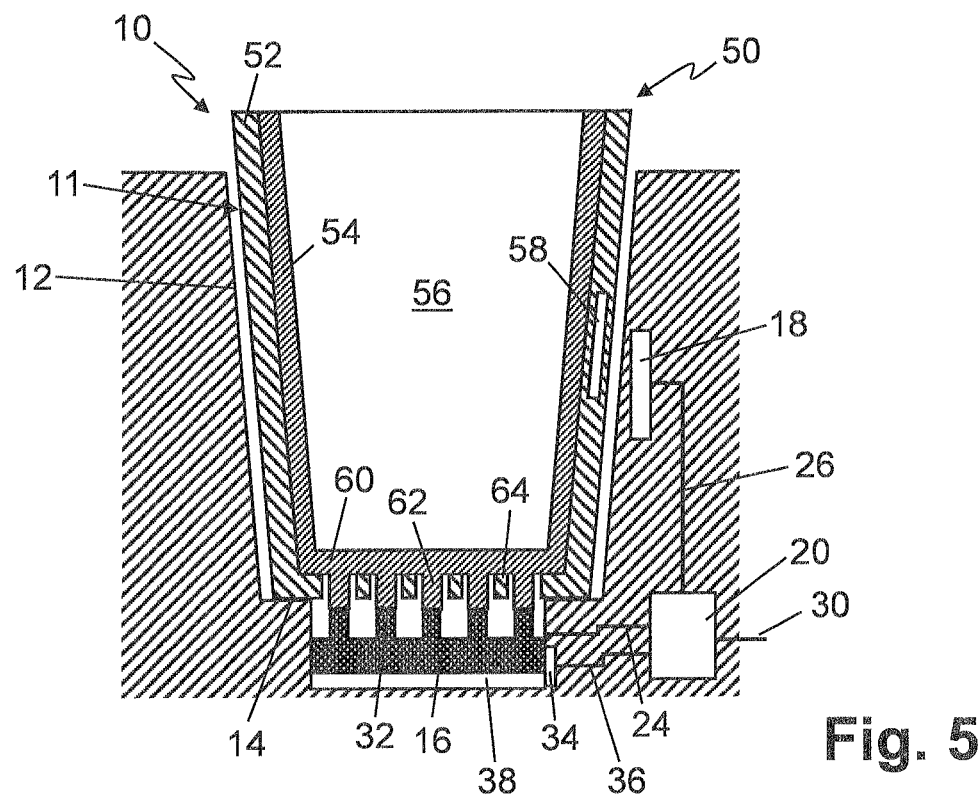
FIG. 5 shows a schematic sectional view of the beverage holder and the beverage container, which is inserted into the beverage holder, of the fourth form of embodiment.

FIG. 5 shows a schematic sectional view of the beverage holder 10 and the beverage container 50, which is inserted into the beverage holder 10, of the fourth form of embodiment. The illustration shown in FIG. 5 shows the downwardly displaced state of the temperature influencing equipment 16 in which the base elements 62 rest on the temperature influencing elements 32.

Figure 6:
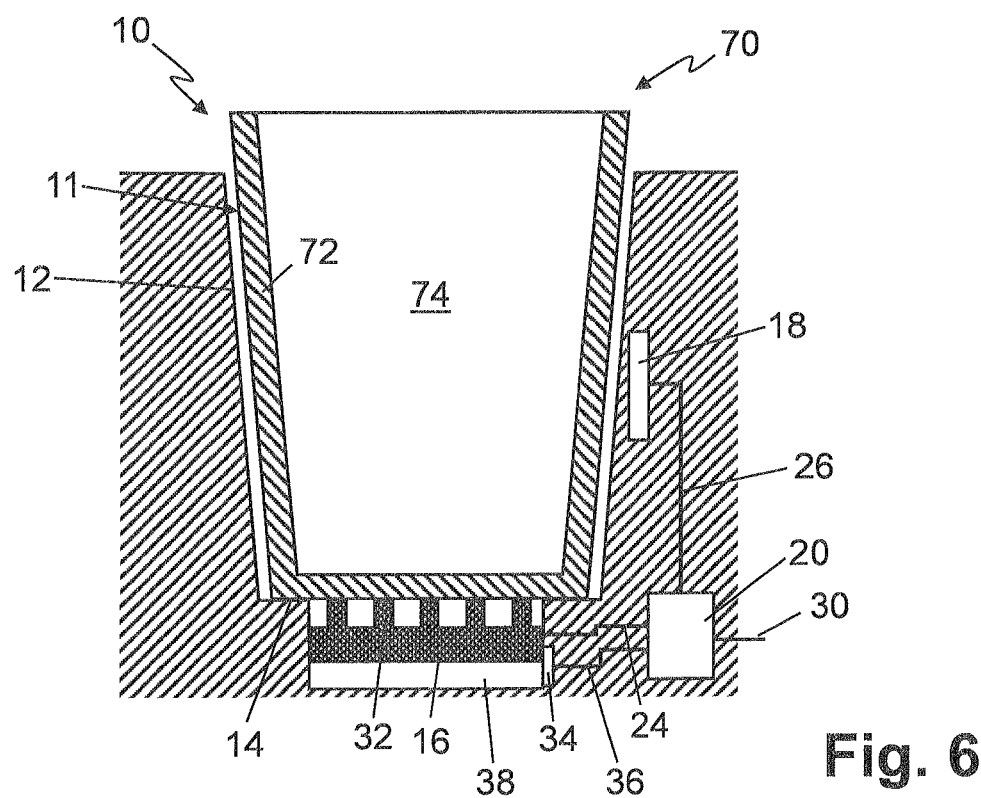
FIG. 6 shows a schematic sectional view of the beverage holder of the fourth form of embodiment and a conventional beverage container inserted into the beverage holder.

FIG. 6 shows a schematic sectional view of the beverage holder 10 of the fourth form of embodiment and a conventional beverage container 70 inserted into the beverage holder. The beverage container 70 has a receiving space 74 as well as a wall 72, which surrounds the receiving space 74, and a base. Since the beverage container 70 has neither a transponder nor a special design of the base the presence of a special beverage container 50 is not ascertained by way of the reader 18 and, in addition, the temperature influencing equipment 16 cannot be displaced downwardly in the space 38. Consequently, there is no report of either from the reader 18 or from the detection unit 34 to the control 20, which thus does not release a widened temperature range for the temperature influencing equipment 16. The temperature influencing equipment 16 can then be operated only in a restricted temperature range.

In particular, the control 20 in further configurations of the fourth form of embodiment permits the widened temperature range for the temperature influencing equipment 16 only when there has been communication not only of a movement from the detection unit 34, but also the presence of a transponder 58 by the reader 18.

Figure 7:
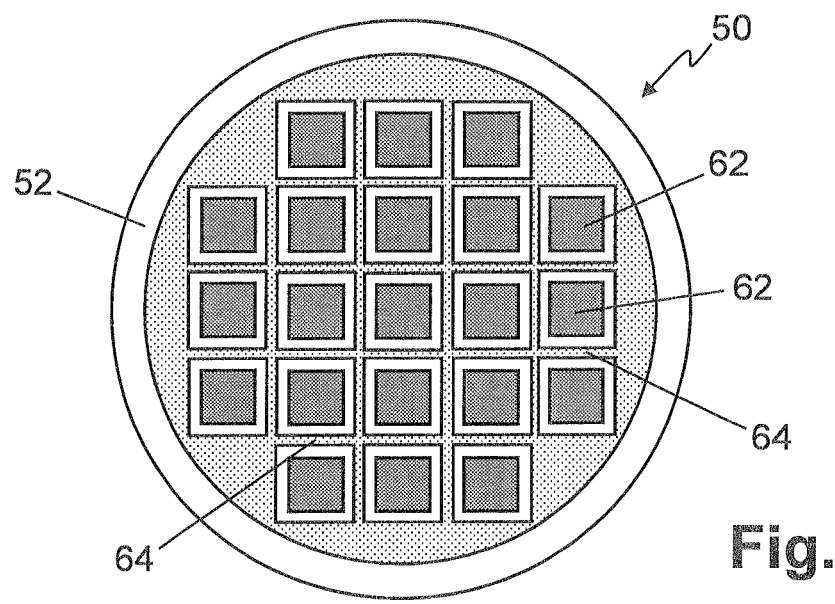
FIG. 7 shows a schematic sectional view of the beverage container of the fourth form of embodiment, from below.

FIG. 7 shows a schematic view of the beverage container 50 of the fourth form of embodiment from below. In that case, the arrangement and construction of the base elements 62 as well as the ribs 64 are illustrated.

Figure 8:
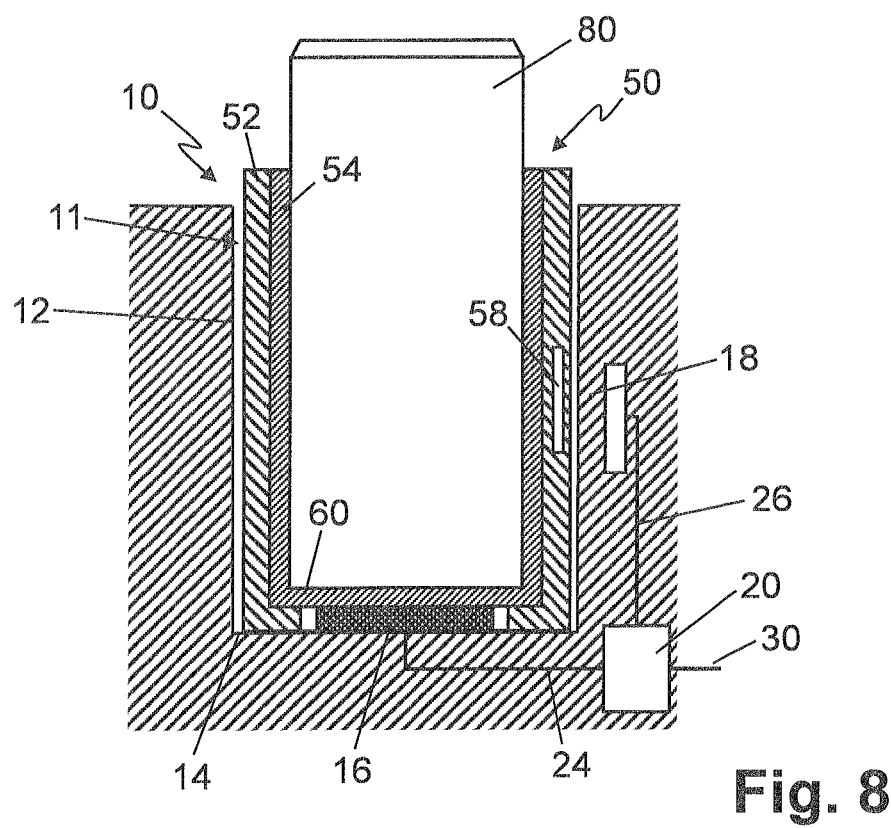
FIG. 8 shows a schematic sectional view of a beverage holder and a beverage container, which is inserted into the beverage holder, with a beverage can received therein, of a fifth form of embodiment.

FIG. 8 shows a schematic sectional view of a beverage holder 10 and a beverage container 50, which is inserted into the beverage holder 10, with a beverage can 80 received therein of a fifth form of embodiment.

The fifth form of embodiment differs from the second form of embodiment in that the receiving space of the beverage container 50 as well as the receiving space 11 of the beverage holder 10 are of cylindrical form. As a result, a cylindrical beverage can 80 can be received in the beverage container 50. The cylindrical form of the receiving space of the beverage container 50 in that case provides a large contact area for the beverage can 80. Better thermal transmission is thereby achieved.

Figure 9:
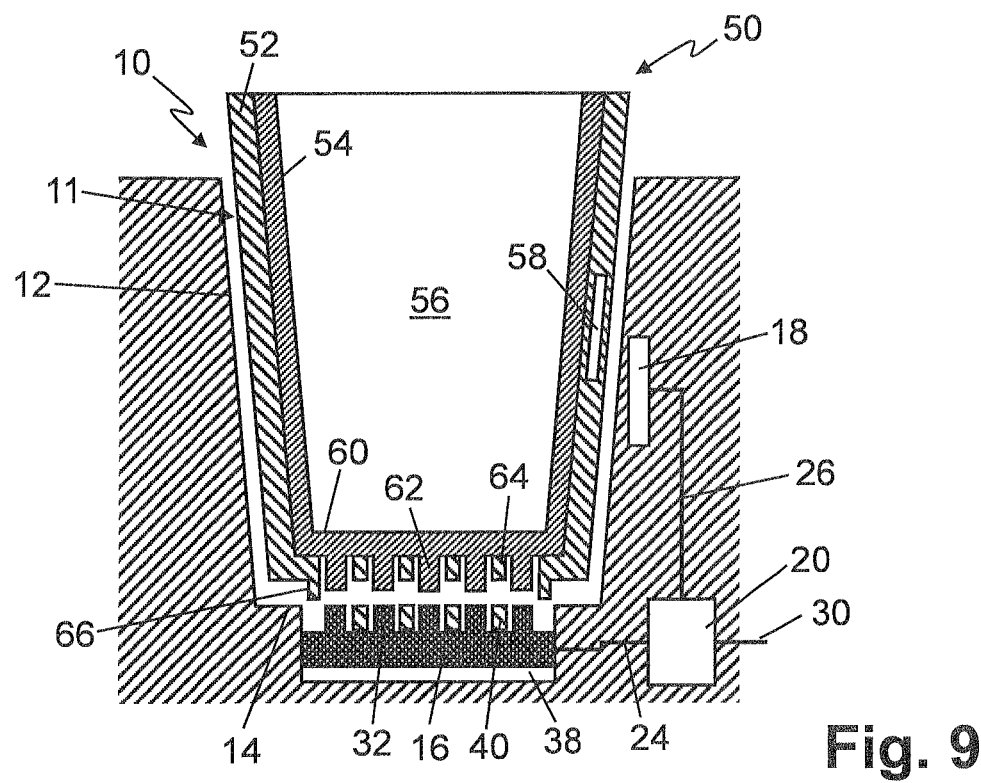
FIG. 9 shows a schematic sectional view of a beverage holder and a beverage container, which is partly inserted into the beverage holder, of a sixth form of embodiment.

FIG. 9 shows a schematic sectional view of a beverage holder 10 and a beverage container 50, which is partly inserted into the beverage holder 10, of a sixth form of embodiment.

The sixth form of embodiment differs from the fourth form of embodiment in that extending between the temperature influencing elements 32 are ribs 40 arranged to be planar with the surface of the base 14. The construction of the temperature influencing elements 32 and the ribs 40 is analogous to the construction of the base elements 62 and the ribs 64 illustrated in FIG. 7. In addition, the insulating layer 52 has an edge 66 which encircles and which protrudes downwardly beyond the base element 62. This serves for further increase in security against burning or chilling, since the beverage container 50 does not provide a direct contact surface outwardly beyond the base element 62. In addition, injury to persons is further prevented by the fact that the ribs 40 in the beverage holder 10 prevent contact with the temperature influencing elements 32. Moreover, displacement of the temperature influencing equipment 16 can take place in upward direction only when cooling or heating of the temperature influencing equipment or of the temperature influencing elements 32 to defined temperature values is detected by way of a detection element 34 (not illustrated for the sixth form of embodiment) or other means.

Figure 10:
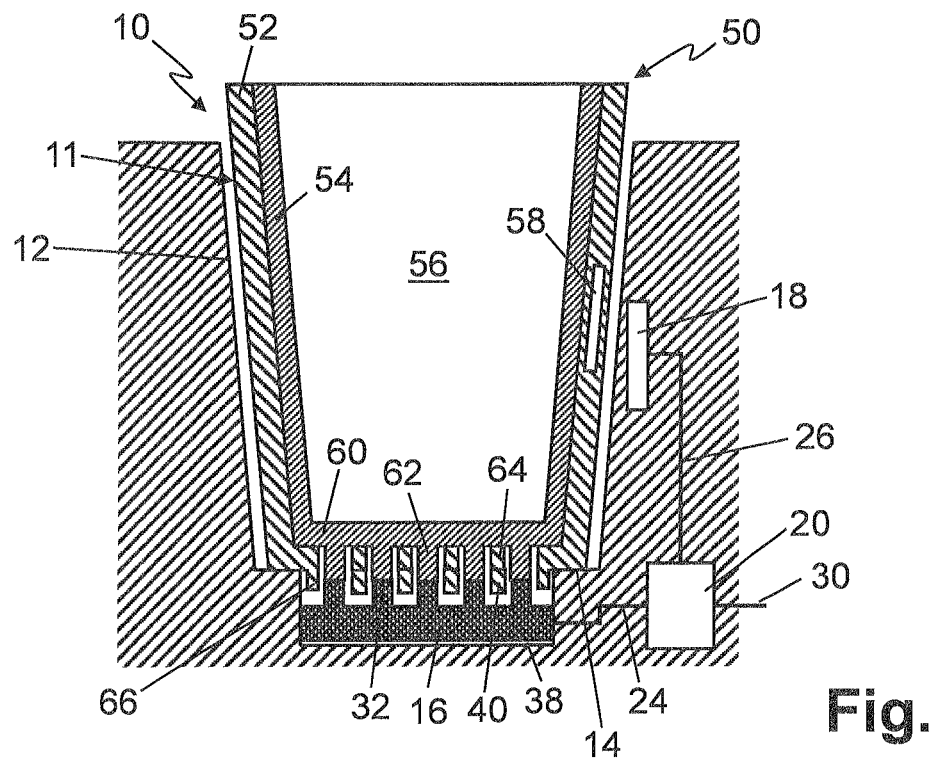
FIG. 10 shows a schematic sectional view of the beverage holder and the beverage container, which is inserted into the beverage holder, of the sixth form of embodiment.

FIG. 10 shows a schematic sectional view of the beverage holder 10 and the beverage container 50, which is inserted into the beverage holder 10, of the sixth form of embodiment, the beverage container 50 being fully inserted into the receiving space 11 of the beverage holder 10.

Figure 11:
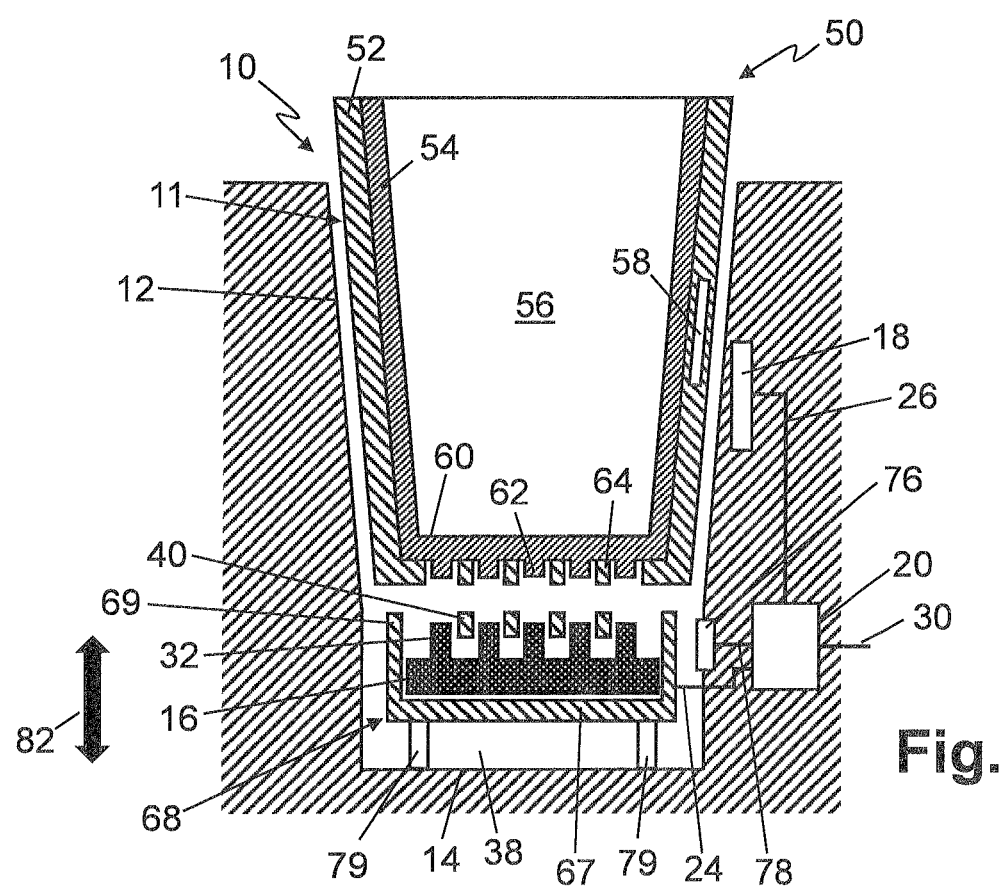
FIG. 11 shows a schematic sectional view of the beverage holder and a beverage container, which partly inserted into the beverage holder, of a seventh form of embodiment.

FIG. 11 shows a schematic sectional view of a beverage holder 10 and a beverage container 50, which is partly inserted into the beverage holder 10, of a seventh form of embodiment.

The seventh form of embodiment differs from the fourth form of embodiment substantially in that it is not the temperature influencing equipment 16 that is displaceable, but an insulating unit 68. The insulating unit 68 has a base 67, an encircling wall 69 and ribs 40. The insulating unit 68 is mounted by way of spring elements 79 on the base 14 to be displaceable in height. In addition, guide means which prevent tipping of the insulating unit 68 during movement in the direction of the arrow 82 and guide the insulating unit 68 can be provided. The spring elements 79 in the embodiment shown in FIG. 11 are compression springs. The insulating unit 68 can have openings or cut-outs by way of which fastening means extend between the receiving space 11 and the temperature influencing equipment 16. The fastening means keep the temperature influencing equipment 16 in position regardless of the position of the insulating unit 68. The fastening means are fixedly connected with the base 14 and/or the wall 12 as well as the temperature influencing equipment 16. The openings and/or cut-outs in the insulating unit 68 are so dimensioned that displacement of the insulating unit 68 is possible without hindrance to the insulating unit 68 by the fastening means. The line 24 similarly extends through one of the openings or cut-outs in the insulating unit 68.

The beverage holder 10 additionally comprises a locking unit 76 which is connected with the control 20 by way of a line 78. The locking unit 76 blocks displacement of the insulating unit 68 when no beverage container 50 or no conventional beverage container is received in the receiving space 11. A person is thereby prevented from accessing the receiving compartment and pressing the insulating unit 68 downwardly and from being injured at hot or cold temperature influencing equipment.

In further embodiments the locking unit 76 is unlocked by way of the control 20 only when a beverage container 50 with a transponder 58 has been received. The locking by the locking unit 76 can be effected mechanically, electrically, electromechanically, electromagnetically or pneumatically. The locking unit 76 is appropriately constructed for that purpose and in the case of locking prevents movement or displacement of the insulating unit 68.

If the beverage container 50 is inserted, the reader 18 recognises the transponder 58 and communicates this information to the control 20. The control 20 thereupon unlocks the locking unit 76. The ribs 64 of the beverage container 50 subsequently press on the ribs 40 and in the case of further pressing of the beverage container 50 in downward direction cause displacement of the insulating unit 68 against the force of the spring devices 79. The spring devices 79 are correspondingly so dimensioned that displacement of the insulating unit 68 can take place without a large expenditure of force, but with a specific minimum expenditure of force.

The base elements 62 then come into contact with the temperature influencing elements 32 and—by way of the contact—cooling or heating can be carried out in a widened temperature range. The spring elements 79 are preferably dimensioned so that the beverage container 50 holds the insulating unit 68 in the downwardly moved position solely by its own weight. Additionally or alternatively thereto the locking unit 76 can lock the insulating unit 68 in the downwardly moved position. If the beverage container 50 is removed, the spring elements 79 urge the insulating unit 68 upwardly again. Subsequently, the ribs 40 again project beyond the temperature influencing elements 32 so that injury by contact of a person with the temperature influencing elements 32 is prevented. Upward displacement by way of the spring elements 79 can take place also only when the locking unit 76 has released the insulating unit 68, this taking place by way of the control 20, which obtains data about lifting of the beverage container 50 by way of, for example, a separate sensor or from the reader 18.

Figure 12:
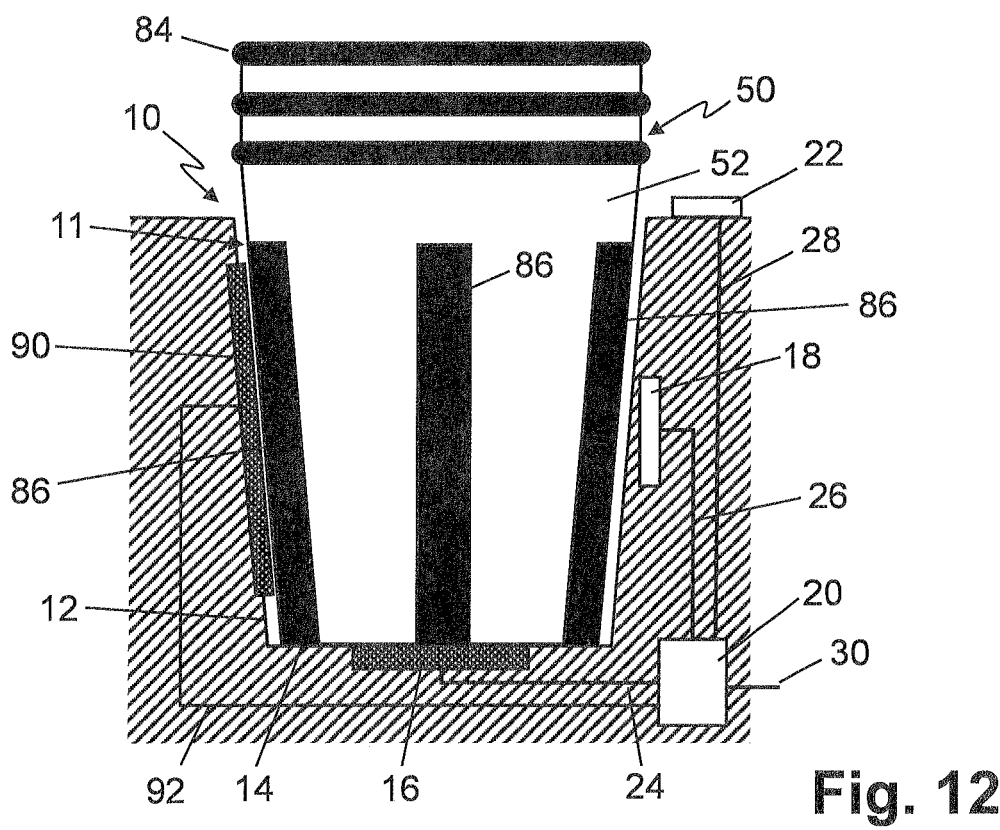
FIG. 12 shows a schematic view of a beverage holder and a beverage container, which is inserted into the beverage holder, of an eighth form of embodiment.
Figure 13:
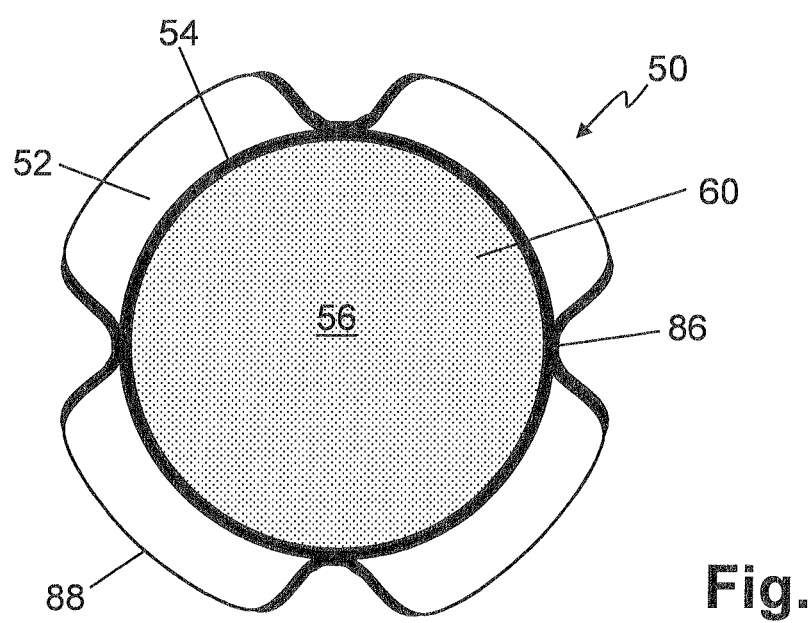
FIG. 13 shows a schematic view of a cross-section through the beverage container of the eighth form of embodiment.

FIG. 12 shows a schematic view of a beverage holder 10 and a beverage container 50, which is inserted into the beverage holder 10, of an eighth form of embodiment and FIG. 13 shows a schematic view of a cross-section through the beverage container of the eighth form of embodiment. Moreover, FIG. 12 shows the beverage holder 10 only in section.

The eighth form of embodiment differs from the first form of embodiment in that the beverage holder 10 comprises additional items of temperature influencing equipment 90, only one item of temperature influencing equipment 90 being illustrated in FIG. 12.

The temperature influencing equipment 90 is connected with the control 20 by way of a line 92. The temperature influencing equipment 16 and the items of temperature influencing equipment 90 can thereby also be operated independently of one another.

The items of temperature influencing equipment 90 project into the receiving space 11. In particular, the items of temperature influencing equipment 90 are so constructed that in the inserted state of the beverage container 50 they bear against thermal conductors 86 of the beverage container 50. The arrangement and construction of the thermal conductors 86 are illustrated, by way of example, in FIG. 13. The beverage container 15 has four thermal conductors 86 distributed uniformly at the circumference. Correspondingly, the beverage holder 10 also has four items of temperature influencing equipment 90. The thermal conductors 86 are connected with the wall 54 and the base 60. In the case of cooling or heating by way of the items of temperature influencing equipment 16 and 90, cooling and heating in that case takes place from below as well as from the side. Cooling or heating can be achieved more rapidly due to the larger thermal transfer area, particularly if the temperature influencing elements 16 and 90 are operated in a widened temperature range.

In order that the beverage container 50 can be easily inserted into and removed from the beverage holder 10 the container has a substantially cylindrical section with three rings 84 consisting of a thermoplastic elastomer. Protection against injuries is achieved in the case of the eighth form of embodiment also by the fact that the thermal conductors 86 are not arranged at the outer circumferential surface of the beverage container 50, but are accommodated in depressions. The illustration of FIG. 13 is merely schematic. Thus, the thermal conductors 86 can also be arranged only in the region of the hollow. The beverage container 50 is held by way of contact surfaces 88 formed by the insulating layer 52. The number and shape of the thermal conductors 86 as well as of the depressions and analogously thereto the construction of the items of temperature influencing equipment 90 can also differ from the eighth form of embodiment shown in FIGS. 12 and 13.

Although not illustrated in FIGS. 12 and 13, the beverage container 50 also has a transponder 58. The presence of the beverage container 50 can therefore be recognised by way of the reader 18.

A conventional beverage container can also be inserted into the beverage holder 10 of the eighth form of embodiment. Since no recognition by the reader 18 takes place, only the temperature influencing equipment 16 or the items of temperature influencing equipment 16 and 90 is or are operated in a restricted temperature range (4° C. to 53° C.).

FIG. 14 shows a schematic view of a beverage holder 10 and a beverage container 50 of a ninth form of embodiment. The ninth form of embodiment differs from the first form of embodiment substantially in that closure equipment is additionally provided. The closure equipment comprises at least two pivotably mounted flaps 94 and a drive unit 96. The drive unit 96 is connected with a control 20 by way of a line 98. The drive unit 96 is, as schematically indicated in FIG. 14, connected with the flaps 94. The flaps 94 are mounted to be pivotable about axes D of rotation and can be brought by way of the drive unit 96 from a horizontal position into an almost vertical position in which the flaps 94 extend substantially parallel to the wall 12 of the receiving space 11. In that case, the flaps 94 are received in receptacles (not illustrated) in the wall 11 so that the flaps 94 do not protrude into the receiving space 11. An intermediate setting of the flaps 94 is illustrated in FIG. 14.

If the beverage container 50 approaches the beverage holder 10 the transponder 18 comes into the reading range of the reader 18. If the spacing between transponder 58 and reader 18 is smaller than a specific minimum spacing, which is determinable by selection of the components, the reader 18 recognises the presence of the beverage container 50. This information is communicated to the control 20, which then causes the drive unit 96 to pivot the flaps 94 downwardly about the axes D of rotation, as illustrated in FIG. 14. In addition, the control 20 releases a widened temperature range for cooling and heating by the temperature influencing equipment 16, as already described for the other embodiments.

If the beverage container 50 is removed from the receiving space 11, the reader 18 recognises the removal of the beverage container 50, since the spacing between reader 18 and transponder 58 is larger or the spacing has exceeded a predeterminable maximum spacing. The control 20 thereupon causes closing of the flaps 94. For that purpose, the flaps 94 are pivoted upwardly by way of the drive unit 96 until they are in a horizontal position. The flaps 94 and the edge, which surrounds the flaps 94, of the receiving space 11 can have sealing means which seal off the receiving space 11 so that the receiving space 11 remains cool or warm for longer. In order that a conventional beverage container 20 can also be received, in further embodiments a control unit (not illustrated) is coupled with the control 20 by way of, for example, the line 30, in which case the control unit communicates a signal to the control 20. By way of the control 20 the signal causes opening of the flaps 94. Closing of the flaps 94 can also be achieved by way of a further signal from the control unit.

If the beverage container 50 has been received in the receiving space 11, the flaps 94 can also be pivoted to such an extent that they bear against the outer wall surface of the insulating layer 52 of the beverage container 50 so as to seal off the space between beverage container 50 and receiving space 11 relative to the environment.

FIG. 14 shows an embodiment with two pivotably mounted flaps 94 having substantially the area of a semicircle. However, several flaps 94 can also be provided, in which case the spacing between the flaps 94 and an outer wall of the beverage container 50 in the inserted state of the beverage container 50 is reduced. In particular, the encircling spacing area when the flaps 94 bear against the outer wall of the beverage container 50 shall be as small as possible.

The beverage container 50 of the ninth form of embodiment has an encircling groove 104 at its outer wall surface of the insulating layer 52. Edges of the flaps 94 engage in this groove when the beverage container 50 is received in the receiving space 11. The sealing is thereby improved. In addition, fixing of the beverage container 50 can take place by way of that. Further sealing means can be provided in the groove 104 so as to further improve the sealing between flaps 94 and beverage container 50.

FIG. 15 shows a schematic plan view of a beverage holder 10 in a tenth form of embodiment. An upper side 100 of a console of a vehicle is illustrated in FIG. 15. The beverage holder 10 is mounted in the console. The beverage holder 10 comprises closure equipment 92 constructed as a diaphragm 102. The diaphragm 102 enables opening and closing of the receiving space 11 and fixing of a beverage container inserted into the beverage holder 10, wherein the beverage container 50 can be held substantially over the entire circumference by the diaphragm 102. Moreover, the construction of the closure equipment 92 as a diaphragm 102 thereby enables good sealing of the space between the receiving space 11 and the insulating layer 52 of a beverage container 50. FIG. 15 shows a partly opened state of the closure equipment 92.

It is possible for, for example, a beverage container of the ninth form of embodiment to be inserted into the beverage holder 10 of the tenth form of embodiment. If the beverage container 50 has been inserted, the diaphragm 102 engages in the groove 104 and seals off the space between insulating layer 52 and wall 12 as well as base 14 of the beverage holder 10. Sealing means are preferably provided in the groove 104. In addition, the beverage container 50 is securely held in the beverage holder 10 and cannot tip.

REFERENCE NUMERAL LIST 10 beverage holder
11 receiving space
12 wall
14 base
16 temperature influencing equipment
18 reader
20 control
22 control unit
24 line
26 line
28 line
30 line
32 temperature influencing element 34 detection unit
36 line
38 space
40 rib
50 beverage container
52 insulating layer
54 wall
56 receiving space
58 transponder
60 base
62 base element
64 rib
66 edge
67 base
68 insulating unit
69 edge
70 beverage container
72 wall
74 receiving space
76 locking unit
78 line
79 spring element
80 can
82 arrow
84 ring
86 thermally conductive element
88 contact area
90 temperature influencing equipment
92 closure equipment
94 flap
96 drive unit
98 line
100 upper side
102 diaphragm
104 groove
D axis of rotation

The invention claimed is:

1. A beverage holder configured for receiving beverage containers, wherein:
the beverage holder has a receiving space for beverage containers having a wall which at least partially surrounds the receiving space, and a base,
at least the base has temperature influencing equipment and the temperature influencing equipment is coupled with recognition equipment,
the recognition equipment is configured for differentiating between a beverage container having a device configured to couple with the recognition equipment and a beverage container without such a device,
the temperature influencing equipment is configured so a beverage container having a device configured to couple with the recognition equipment, can rest at least partially on the temperature influencing equipment, and
a control configured for the purpose of controlling the temperature influencing equipment at least in dependence on the differentiation by the recognition equipment.

2. The beverage holder according to claim 1, wherein the recognition equipment comprises a reader configured for reading an NFC chip and/or a transponder.

3. The beverage holder according to claim 1, wherein the temperature influencing equipment is mounted to be displaceable in height and is displaceable by way of the beverage container having the device, or the beverage holder comprises an insulating unit which is mounted to be displaceable in height and which is displaceable by the beverage container.

4. The beverage holder according to claim 3, wherein the beverage holder is configured in the displaced state of the temperature influencing equipment or the insulating unit to mechanically or electrically release an operating mode of the temperature influencing equipment.

5. The beverage holder according to claim 3, wherein the temperature influencing equipment comprises a plurality of height-displaceable temperature influencing elements, and/or the insulating unit comprises a plurality of height-displaceable insulating elements.

6. The beverage holder according to claim 1, wherein the wall has at least one temperature influencing equipment configured to project into the receiving space.

7. The beverage holder according to claim 1, wherein the temperature influencing equipment comprises a Peltier element.

8. The beverage holder according to claim 1, wherein the control is connected with or comprises further devices for detection of an actual temperature and for setting a target temperature, and/or the control is connected with or comprises a memory in which temperature values are variably storable.

9. The beverage holder according to claim 1, further comprising closure equipment configured to hold a beverage container, and having a device configured to couple with the recognition equipment, in the received state in the receiving space and to close the receiving space when no beverage container is received.

10. The beverage holder according to claim 2, wherein the temperature influencing equipment is mounted to be displaceable in height and is displaceable by way of the beverage container with the device or the beverage holder comprises an insulating unit which is mounted to be displaceable in height and which is displaceable by way of the beverage container.

11. The beverage holder according to claim 10, wherein the beverage holder is configured in the displaced state of the temperature influencing equipment or the insulating unit to mechanically or electrically release an operating mode of the temperature influencing equipment.

12. The beverage holder according to claim 4, wherein the temperature influencing equipment comprises a plurality of height-displaceable temperature influencing elements and/or the insulating unit comprises a plurality of height-displaceable insulating elements.

13. A beverage container with a device for recognition of the beverage container, wherein
the beverage container comprises a receiving space having a wall which surrounds the receiving space, and a base,
the receiving space comprises a thermally conductive material at least partially,
the beverage container comprises an insulating layer which at least partially surrounds the receiving space and comprises a thermally insulating material,
the base of the receiving space at least partially is not covered by the insulating layer,
the beverage container comprises a device configured to communicate a presence of the beverage container in the beverage holder to recognition equipment in the beverage holder, and
the beverage container is configured so that the base of the receiving space in the inserted state of the beverage container rests at least partially on temperature influencing equipment of the beverage holder.

14. The beverage container according to claim 13, wherein a transponder and/or an NFC chip is or are arranged in the insulating layer.

15. The beverage container according to claim 13, wherein the base of the receiving space projects beyond the insulating layer or the insulating layer projects beyond the base of the receiving space.

16. The beverage container according to claim 15, wherein the base of the receiving space comprises a plurality of base elements and an insulating layer which surrounds the base elements at a spacing and projects beyond the base elements.

17. The beverage container according to claim 13, wherein the base and/or wall is or are connected with at least one thermally conductive element extending along the wall, wherein the at least one thermally conductive element is arranged in a depression in the base and/or wall and the insulating layer projects at least partially beyond the at least one thermally conductive element.

18. The beverage container according to claim 13, wherein the beverage container is configured for receiving a beverage and/or a beaker, a cup, a bottle, a glass, a can or a beverage pack in the receiving space, and/or the material of the receiving space is a metal or a plastics material, and/or the material of the insulating layer is a plastics material, and/or the beverage container is of conical construction at least partially.

19. The beverage container according to claim 13, further comprising a locking device by way of which the beverage container is fixable in the beverage holder.

20. The beverage container according to claim 14, wherein the base of the receiving space projects beyond the insulating layer or the insulating layer projects beyond the base of the receiving space.

21. The beverage container according to claim 20, wherein the base of the receiving space comprises a plurality of base elements and an insulating layer which surrounds the base elements at a spacing and projects beyond the base elements.

* * * * *

UNITED STATES PATENT AND TRADEMARK OFFICE
CERTIFICATE OF CORRECTION

PATENT NO. : 10,696,205 B2
APPLICATION NO. : 15/571472
DATED : June 30, 2020
INVENTOR(S) : Uhlenbusch et al.

Page 1 of 1

It is certified that error appears in the above-identified patent and that said Letters Patent is hereby corrected as shown below:

On the Title Page

Third Foreign Patent Document, "DE 102008012218 9/2010 ............... B65B 1/18" should be --DE 102008012218 9/2009 ............... B65B 1/18--.

In the Claims

Claim 1, Column 19, Line 50, "is configured so a" should be --is configured so that a--.

Signed and Sealed this
Fifteenth Day of October, 2024

Katherine Kelly Vidal
*Director of the United States Patent and Trademark Office*